Aug. 9, 1932.  A. C. FUHRMAN  1,870,502
FIFTH WHEEL CONSTRUCTION
Filed Sept. 15, 1930  2 Sheets-Sheet 1
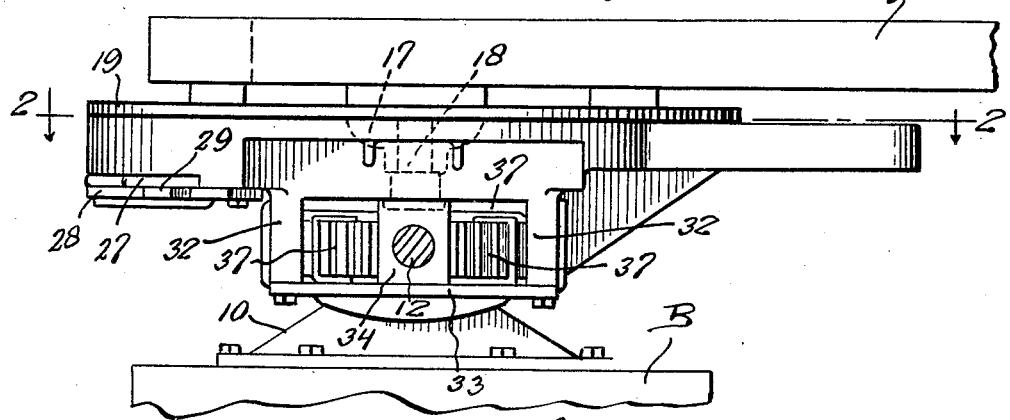
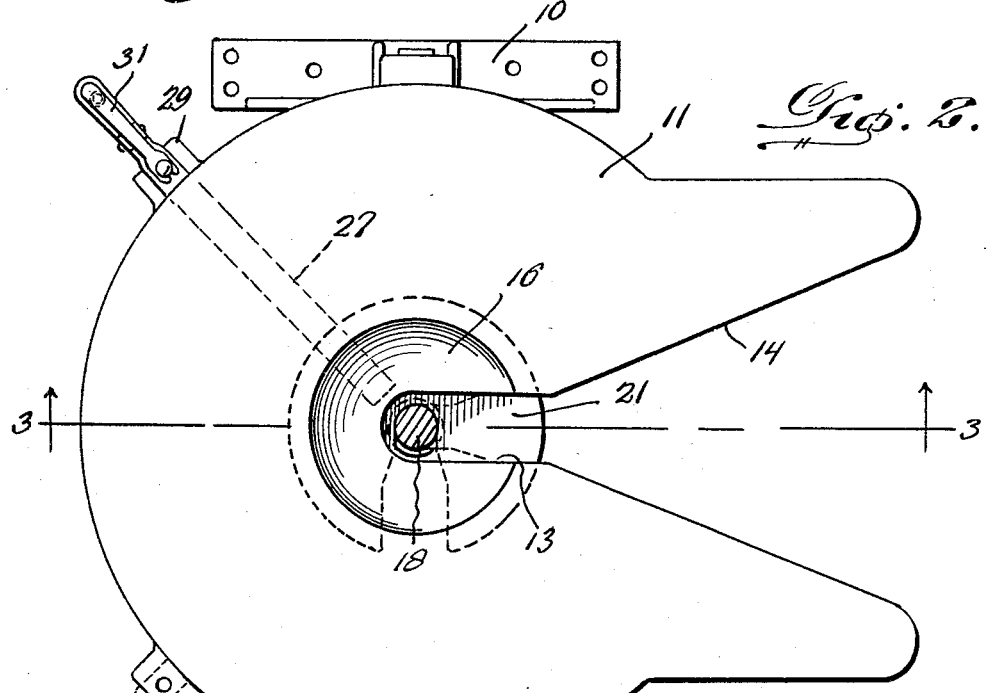
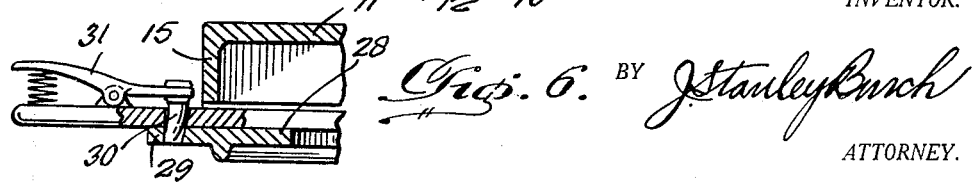
Albert C. Fuhrman,
INVENTOR.
BY J. Stanley Burch
ATTORNEY.

Aug. 9, 1932.  A. C. FUHRMAN  1,870,502
FIFTH WHEEL CONSTRUCTION
Filed Sept. 15, 1930   2 Sheets-Sheet 2
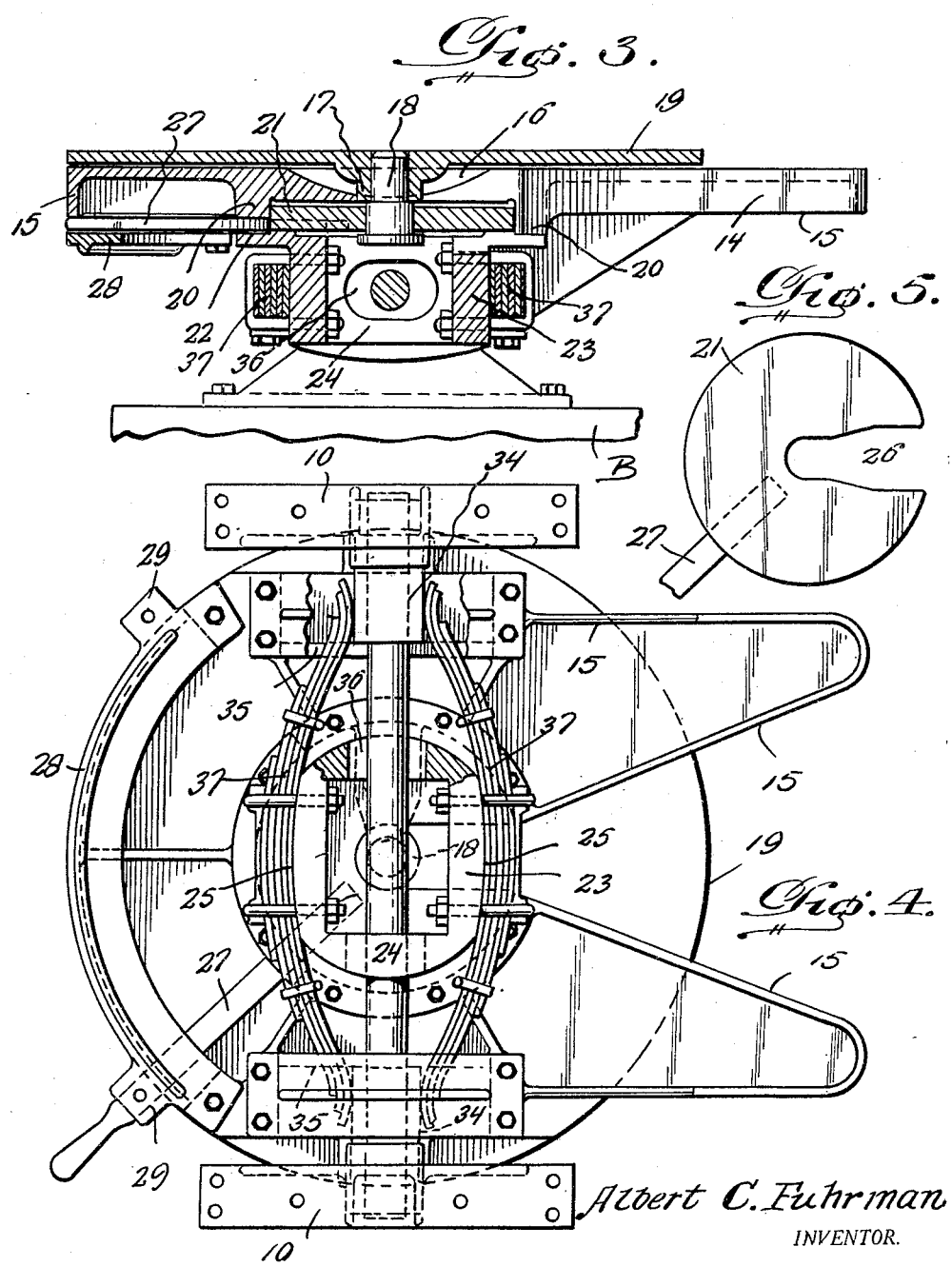
Albert C. Fuhrman
INVENTOR.
BY J. Stanley Burch
ATTORNEY.

Patented Aug. 9, 1932

1,870,502

UNITED STATES PATENT OFFICE

ALBERT C. FUHRMAN, OF CANTON, OHIO

FIFTH WHEEL CONSTRUCTION

Application filed September 15, 1930. Serial No. 482,030.

This invention relates to means for coupling a trailer to a tractor part of a motor vehicle, and has particular reference to improvements in what is known as fifth wheel constructions.

It is the object of the present invention to simplify the construction of the fifth wheel for the purpose above mentioned, and to provide a novel and positive means for locking the wheel in its active position, thereby eliminating the possibility of accidental separation of the trailer from the vehicle.

Another important object of the invention resides in the provision of means for cushioning the load of the trailer incident to both starting and stopping of the latter.

Other objects and advantages will appear from the following detailed description taken in connection with the accompanying drawings, the invention residing in the construction, combination and arrangement of parts as claimed.

In the drawings forming part of this application like numerals of reference indicate similar parts in the several views and wherein:

Figure 1 is a side elevation showing fragmentary parts of the trailer and motor vehicle connected together.

Figure 2 is a sectional view on line 2—2 of Figure 1.

Figure 3 is a section on line 3—3 of Figure 2.

Figure 4 is a bottom plan view.

Figure 5 is a view of the locking plate.

Figure 6 is a fragmentary sectional view showing how the lever of the locking plate is held fixed in a given position.

Referring to the drawings in detail A indicates generally the tractor part of a motor vehicle, while B represents a part of a trailer capable of being quickly and conveniently associated with the vehicle, or detached therefrom by means of the fifth wheel construction constituting the subject matter of the present invention.

The tractor part A includes spaced bearings 10 in which the body or plate 11 of the wheel is mounted for tilting movement, and for which purpose the plate 11 is provided with a shaft 12 journaled in said bearings as illustrated. The plate 11 is characterized by a transverse slot 13 communicating with a throat 14, while the plate is also formed with a depending flange 15 about the edges thereof as shown. The upper surface of the plate 11 is provided with a centrally located concavity 16 to receive the bearing 17 for the pin 18, and which are carried by the disk 19 associated with the trailer B. Immediately beneath the concavity 16 the plate is provided with a centrally arranged hollow boss 20 of dimensions to accommodate the locking plate 21 as clearly illustrated in Figure 5. This locking plate is freely mounted in the hollow boss for rotation, and is held in position therein by the flange 22 of a hollow casting 23. The flange 22 of said casting is bolted or otherwise suitably secured to the boss 20, while the casting itself is substantially circular in plane, but provided with a squared opening 24 and two opposed flat sides or portions 25 for a purpose to be hereinafter described.

The locking plate 21 is characterized by a throat or passage 26 similar to the throat 14 of the plate 11 with which it coincides to slidably receive the pin 18 incident to the association of the trailer and vehicle, after which the locking plate 21 is partly rotated to arrange its passage 26 at a right angle to the throat 14 of the plate 11. The movements of the locking plate are controlled by a lever 27 carried thereby, and which projects beyond the plate 11, sliding between the flange 15 thereof and an arcuate shaped narrow plate 28 secured to the lower edge of the flange 15. This arcuate shaped plate 28 is formed with apertured lug extensions 29 adjacent the opposed ends thereof, to alternately receive a locking dog 30 carried by a spring influenced lever 31 pivoted upon the lever 27 as shown in Figure 6. Consequently the locking plate 21 is held immovable in either of its two positions, to both facilitate the association of the trailer with the vehicle, and to prevent accidental separation of said parts under any circumstances.

The invention also provides a means for cushioning the load of the trailer incident to both the starting and stopping of the same, and with this object in view, the flange 15 of the plate 11 is formed at diametrically opposite points with spaced pairs of depending members 32 which lie inwardly of and within the confines of the plate 11 as illustrated. Each pair of these depending members 32 are connected at their lower ends by a plate 33 thereby defining a channel by the intervening space between the members 32 and the plate 33. Each channel receives a block 34 carried by the shaft 12, which block is slipped upon said shaft and limited in its movement in one direction by a stop flange 35 projecting within each channel. Upon inspection of Figures 3 and 4 it will be noted that the shaft 12 passes through the hollow boss 20 and also through the channels above referred to, and that the opposed end walls of the boss 20 are provided with elongated slots 36 to permit of a yielding or cushioning movement of the fifth wheel construction with relation to the shaft 12, and thereby absorb the shock or jar of the trailer and its load incident to the starting and stopping of the same. For this purpose I also employ spaced leaf springs 37 which are bolted or otherwise suitably secured to the flat sides 25 of the boss 20, while the free ends of the springs bear against the opposite sides of the blocks 34. Consequently, in addition to providing for a tilting movement of the fifth wheel construction, necessary to its successful use or operation, the entire structure also affords a yielding or cushioning effect in a horizontal plane to take care of the shock or jars to which the trailer and its load would be otherwise subjected to, incident to both the starting and stopping of the trailer. Furthermore, the invention is very simple in its construction and can be used to very good advantage for the purpose intended, with no possibility of the trailer being casually separated or dropped from the vehicle under any circumstances.

While it is believed that from the foregoing description the nature and advantages of the invention will be readily understood, I desire to have it known that I do not limit myself to what is herein illustrated and described and that such changes may be resorted to when desired as fall within the scope of what is claimed.

What I claim is:

1. In a fifth wheel construction, a body plate having a slot and throat communicating with each other, a hollow boss depending centrally from said plate, a disk adapted to repose upon said plate, a pin projecting from said disk, a locking plate received by said boss for rotation therein and having a passage adapted to coincide with said slot and throat of the body plate to slidably receive said pin, means for rotating said locking plate from a remote point, a hollow casting secured to the lower edge of said boss and holding the locking plate positioned therein, and means including a shaft passed through said casting for supporting the body plate for tilting movement.

2. In a fifth wheel construction, a body plate having a slot and throat communicating with each other, a hollow boss depending centrally from said plate, a disk adapted to repose upon said body plate, a pin projecting from said disk, a locking plate received by said boss for rotation therein and having a passage adapted to coincide with said slot and throat of the body plate to slidably receive said pin, means for rotating the locking plate from a remote point, a hollow casting secured to the lower edge of said boss and holding the locking plate positioned therein, means including a shaft passed through said casting for supporting the body plate for tilting movement, said casting having elongated slots receiving said shaft, and means secured to the opposite sides of said boss for yieldably supporting the entire structure for horizontal movement with relation to said shaft for the purpose specified.

3. In a fifth wheel construction, a body plate having a slot and throat communicating with each other, a disk adapted to repose upon said body plate, a pin projecting from said disk and slidably received by said slot through said throat, means operable from a remote point for locking the disk to said plate, a hollow casting supported centrally of and beneath the body plate and having spaced elongated slots therein, means including a shaft passed through said slots for supporting the body plate for tilting movement, and means for yieldably supporting the entire structure for horizontal movement with relation to said shaft for the purpose specified.

4. In a fifth wheel construction, a body plate having a slot and throat communicating with each other, a disk adapted to repose upon said plate, a pin projecting from said disk and slidably received by the slot through the said throat, means operable from a remote point for locking the disk to said plate, means including a shaft for supporting said plate for tilting movement, opposed channel-like members depending from the plate adjacent the periphery thereof, and receiving said shaft, blocks carried by the shaft and movable within the channel-like members, and opposed leaf springs secured beneath said plate and terminally bearing against said blocks to afford the entire structure a slight yielding horizontal movement with relation to the shaft for the purpose specified.

5. In a fifth wheel construction, a body plate having a slot and throat communicating with each other, a hollow boss depending centrally from said plate, a disk adapted to repose upon the body plate, a pin projecting from said disk, a locking plate received by said boss for rotation therein and having a passage adapted to coincide with said slot and throat of the body plate to slidably receive said pin, means for rotating the locking plate from a remote point, a hollow casting secured to said boss for holding the locking plate positioned therein, and having opposed elongated slots, channel-like members depending from the plate on opposite sides of said casting, means including a shaft passed through the slots of the casting and said channel-like members for supporting the body plate for tilting movement, blocks carried by the shaft and received within the channel-like members, and opposed leaf springs secured to the said casting and terminally bearing against the said blocks, whereby the entire structure is afforded yielding movement horizontally with relation to the shaft for the purpose specified.

In testimony whereof I affix my signature.

ALBERT C. FUHRMAN.